Sept. 25, 1962          C. ROMING, JR          3,055,942
PROCESS FOR REMOVING METAL CONTAMINANTS FROM ORGANIC MIXTURES
Filed May 15, 1959
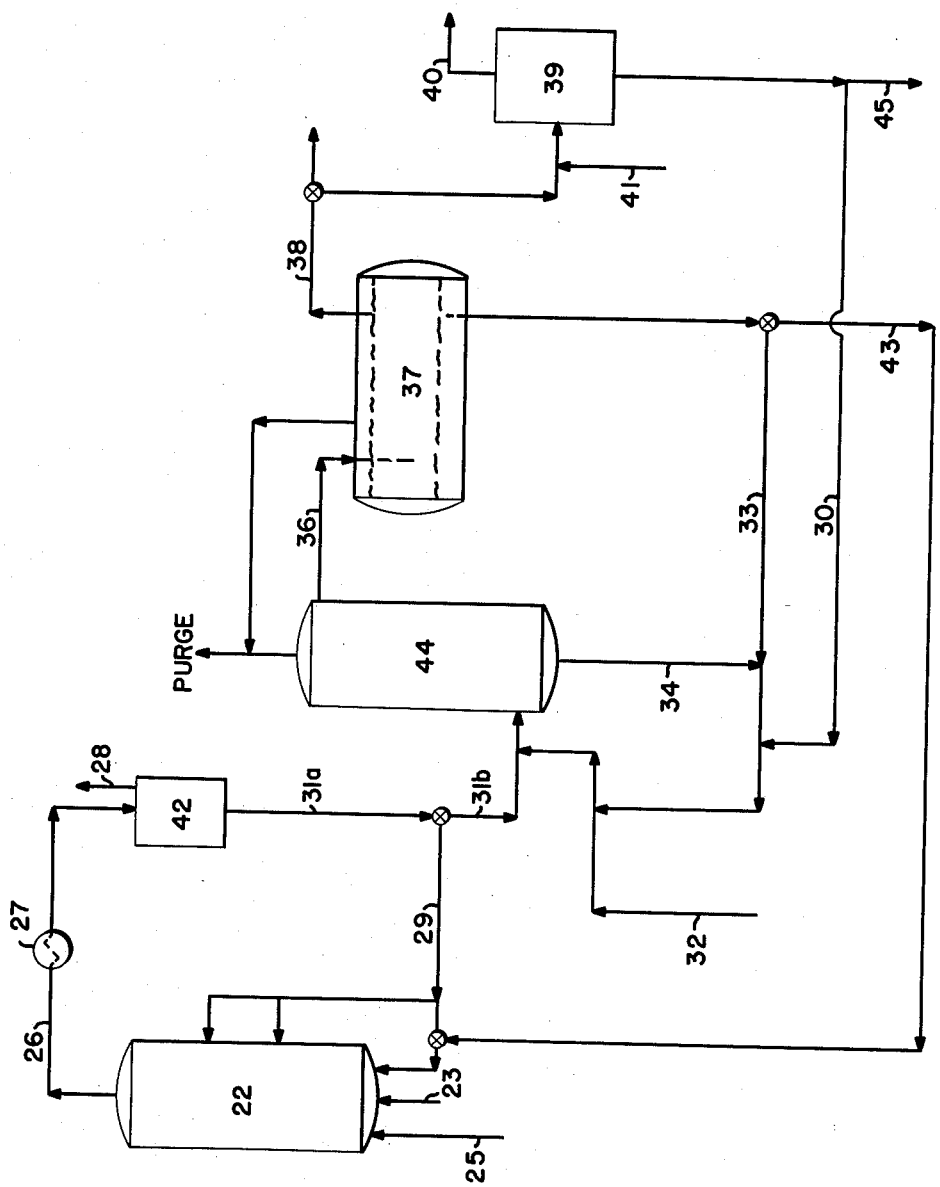
Charles Roming, Jr.     Inventor
By *Seymour Stahl* Patent Attorney United States Patent Office 3,055,942
Patented Sept. 25, 1962

3,055,942
PROCESS FOR REMOVING METAL CONTAMINANTS FROM ORGANIC MIXTURES
Charles Roming, Jr., Towaco, N.J., assignor to Esso Research and Engineering Company, a corporation of Delaware
Filed May 15, 1959, Ser. No. 813,476
4 Claims. (Cl. 260—604)

The present invention relates to the preparation of organic compounds by the reaction of carbon monoxide and hydrogen with carbon compounds containing olefinic linkages in the presence of a carbonylation catalyst. More specifically the present invention relates to the removal and recovery of metal catalyst or catalysts utilized in the foregoing reaction from the product of the first stage of the carbonylation reaction in a manner which will permit reuse of the catalyst metal in the system.

It is now well known in the art that oxygenated organic compounds may be synthesized from organic compounds containing olefinic linkages by a reaction with carbon monoxide and hydrogen in the presence of a catalyst containing metal of the iron group, such as cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents, and solvents. Amenable to the reaction are long and short-chain olefinic compounds, depending upon the type alcohols desired. Not only olefins, but most organic compounds possessing at least one non-aromatic carbon-carbon double bond may be reacted by this method. Thus, straight and branched-chain olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, and other sources of hydrocarbon fractions containing olefins, may be used as starting material, depending upon the nature of the final product desired.

This invention is also amenable to the modified oxo process referred to herein as the Aldox reaction where a co-catalyst such as zinc, mercury, bismuth, magnesium and in general group I, II, IV and VI metal containing components are employed to effect the simultaneous production of monomeric and dimeric aldehydic products containing $n+1$ and $2n+2$ carbon atoms, where $n$ equals the number of carbon atoms in the olefin feed. In general, the Aldox catalyst will comprise from 0.02–1 weight percent cobalt catalyst and from 0.02–1 weight percent Aldox modifier with or without other co-catalysts, the above weight percent is calculated as metal based on olefin feed. Thus, by the Aldox reaction, heptene is a feed stock for iso-octyl and hexadecyl aldehydes and/or alcohols. Propylene may be converted primarily to $C_4$ and $C_8$ aldehydes and/or alcohols in this manner. The Aldox reaction employs the same general conditions as the conventional oxo reaction with the addition of the aforenoted co-catalysts. For ease of discussion, the general description will refer to a cobalt catalyst system although it is to be understood that bi- and tri-component system, such as indicated above for the Aldox reaction, can be treated in the same manner.

The catalyst in the first stage of the prior art processes is usually added in the form of salts of the catalytically active metal with higher molecular weight fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as a hydrocarbon solution or dissolved in the olefin feed. Lower molecular weight salts such as the acetate, formate, propionate, and the like, are also valuable catalysts for this process.

The synthesis gas mixture fed to the first stage may consist of any ratio of $H_2$ to CO, 1:4 to 4:1, but preferably these gases are present in about equal mole ratios. The conditions for reacting olefins with $H_2$ and CO vary somewhat in accordance with the nature of the olefin feed, but the reaction is generally conducted at pressures in the range of about 1000 to 4500 p.s.i.g. and at temperatures in the range of about 200–400° F. The ratio of synthesis gas to olefin feed may vary widely; in general, about 1500 to 10,000 standard cubic feet of $H_2$+CO per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present invention principally applies.

From the catalyst removal zone, the reaction products, comprising aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. The exact mechanism of catalysis is not understood, however, in general any metal catalyst employed will find its way into the aldehydic product and must be removed prior to hydrogenation. This dissolved catalyst in its several forms should be removed prior to the subsequent hydrogenation, as otherwise it would separate out on the hydrogenation catalyst, plug transfer lines and heat exchangers. Deactivation of the hydrogenation catalyst may occur if appreciable amounts of metal remain in the feed to the hydrogenation reactor. The metal carbonyl remains dissolved in the reaction product from the primary carbonylation stage and is, therefore, removed in the catalyst removal or decobalting zone.

One way to remove metal catalyst is by a thermal method, wherein the accrued product, comprising unreacted feed material, aldehydes, and, to a lesser extent, alcohols containing substantial amounts of dissolved cobalt as carbonyl and also oil-soluble salts and complexes and compounds, is treated, preferably in the presence of a stripping gas, at temperatures of about 300–350° F. Heat may be supplied by a coil or other heat transfer surface immersed in the liquid. The purpose of the inert stripping gas, such as hydrogen, is to decrease the CO partial pressure by removing CO as soon as formed by decomposition of the carbonyl, thus pushing the equilibrium decomposition reaction forward.

This process, however, is usually not satisfactory. Periodically it is necessary to take the demetalling vessel off stream to remove accumulated metallic cobalt, to prevent plugging of feed lines and heat transfer surfaces, upon which the catalyst residuum deposit as a hard film of metal. The removal of these films and deposited cobalt metal is a tedious and difficult process, and adds significant costs to the economics of the carbonylation reaction. Furthermore, thermal decobalting usually does not completely remove soluble cobalt from the aldehydic product, for although the cobalt carbonyl is generally decomposed, other cobalt compounds present in the first stage aldehyde product, which may have arisen from secondary reactions in the oxo stage, such as formic acid formation, are not decomposed under the thermal treating conditions. Other demetalling techniques employing steam or water remove catalysts satisfactorily but not in a form suitable for recycle to the oxo reactor.

These difficulties were to a great extent removed when it was found that efficient decobalting was obtained with a residual cobalt content of the aldehydic product less than 10–50 parts per million if the contaminated aldehydic product from the oxo stage was treated with dilute aqueous solutions of organic acids whose cobalt salts are water-soluble and oil-insoluble.

For ease of discussion reference will be had to acetic acid as the decobalting agent since this acid is the preferred one. It is to be understood, however, that other low molecular weight organic acids are operative for this purpose and these include formic, oxalic, propionic and the like.

An important advantage of an acid decobalting operation, besides the fact that lower temperatures are required than in thermal decobalting, is that cobalt recovery is considerably simplified and made more feasible. Similarly, co-catalysts such as Zn salts may also be removed by this technique. It is highly preferred, both for an economic operation and because of the strategic importance of these metals, that substantially all of the metal be recovered and reused. This is impractical in purely thermal processes, for the metal is precipitated on packing, reactor walls and heat transfer surfaces, and forms hard films, necessitating removal of the unit and drilling, etc., as well as cumbersome filtration operations. Recovery in this manner also necessitates subsequent treating to convert the metal to usable form, e.g., fatty acid salts. The effect of dilute aqueous organic acid injection, however, is to convert substantially all of the cobalt and other metals dissolved in the aldehydic carbonylation-stage product, regardless in what form it is present, into water-soluble salts, complexes and compounds, and this aqueous stream is readily separated from the demetalled aldehydic product.

The utilization of this aqueous cobalt stream, however, which may have a cobalt concentration of from 0.5 to 1.5 wt. percent poses several real problems. The most efficient method of utilization would be by recycling this aqueous stream directly to the primary aldehyde synthesis zone. This step, however, has the drawback in that it involves recycling substantial quantities of water to the aldehyde synthesis zone. Though relatively small amounts of water have been found useful in increasing selectivity to the desired aldehydes, larger amounts have been found to cause reactor flooding with stratification and quenching of the reaction. Flooding is particularly liable to occur if the cobalt solution recovered from the acid decobalter is relatively dilute.

Hence, only a small portion of the aqueous cobalt-containing solution from conventional acid decobalting techniques can be recycled directly to the main carbonylation reactor.

It is, therefore, an object of this invention to provide a dematalling system for carbonylation reactions wherein at least a major amount of the catalyst is recovered from the demetalling zone in form suitable for recycle to the oxonation reactor without causing reactor upset by flooding.

It is a further object of this invention to provide a demetalling technique when utilizing Aldox catalyst systems comprising two or more metal containing components.

Other objects and advantages of the present invention will be apparent from the more detailed description to follow wherein reference is made to the accompanying drawing which is a schematic illustration of a system suitable for carrying out a preferred embodiment of the invention.

Turning now to the FIGURE, olefin feed is passed after preheating through feed line 25 to the bottom portion of primary reactor 22. The latter comprises a reaction vessel which may, if desired, be packed with non-catalytic materials such as Raschig rings, pumice, etc., and may be divided into discrete packed zones. Catalyst is added in the amounts indicated previously, e.g. .2 weight percent cobalt on olefin feed, with like amounts of an Aldox modifier, if desired, and consists of suitable quantities of fresh makeup, e.g., as a mixture with the feed olefin via line 25, plus recycle aqueous solution, e.g., via line 43 as explained later.

A gas mixture comprising preferably a $H_2$:CO mole ratio of about 1:1 is fed into the reactor via line 23 and flows co-currently with the feed. Typical reactor temperatures include 330° F. with a pressure of 3000 p.s.i.g. The conditions will vary with the particular olefinic feed, conversion level desired, catalyst concentration, etc.

Aldehydic product, principally monomer aldehyde in the case of conventional oxo, and a mixture of monomer and dimer aldehydes in the case of Aldox, is withdrawn from reactor 22 via line 26 and cooler 27 to high pressure separator 42, which contains a pressure substantially the same as reactor 22. Unreacted gases, e.g. $H_2$, CO and inerts, are withdrawn via line 28 for recycle or purge, as desired. Degassed product in part may be recycled via line 29 as a coolant and the remainder is passed to a low pressure separator (not shown), if desired, to remove residual gases. The remaining metal-contaminated carbonylation product at 15–500 p.s.i.g. and at slightly elevated temperatures is passed to demetalling zone 44 via line 31. This unit is of conventional design and is adapted to thoroughly mix aqueous and water insoluble liquid organic phases. Preferred pressure and temperature ranges for the demetalling zone are 150–180° F. and 30–75 p.s.i.g., although temperatures and pressures over a wider range, i.e. 15–500 p.s.i.g. and 90–400° F., may be employed. Small amounts of acetic acid makeup, i.e., 0–100 wt. percent (concentration) and 0–10 volume percent as 100% acid based on total aldehydic product are admitted, for instance, via line 32. A concentrated aqueous cobalt ion solution containing salts and the carbonyls and molecular complexes of the metal catalyst is fed in via line 33 together with makeup water, if desired, via line 30 and pump-around decobalter mixture via line 34. The decobalting is effected in the presence of a mixture of aqueous cobalt acetate and acetic acid.

|  | Preferred | Range |
| --- | --- | --- |
| Aqueous phase: | | |
| Water, volume percent [1] | 6 to 20 | 4 to 60+. |
| Weight percent cobalt | 3 to 5 | 0 to solubility. |
| Acetic acid [2] | 0.1 to 0.5 | 0.05 to 10. |

[1] Volume percent based on aldehyde plus alcohol content.
[2] As 100% acid.

The mixture from decobalter 44 is, after gas purging and reflux, passed via line 36 to settling drum 37 where the organic and aqueous phases are allowed to separate. Gas may be purged from the upper aldehydic phase and, if desired, some of the organic phase may be recycled to decobalter 44. This latter option is dependent on the degree of demetalling achieved on a once through basis. In the settler, water soluble metal compounds remain in the aqueous phase together with any solid metal containing precipitate which may occur. Holding time in this vessel should, of course, be sufficient to effect phase separation. A predominant amount of the aqueous layer will separate in a short time, whereas the remaining aqueous portion which may amount to 3–10% requires longer holding time, e.g., up to 2–12 hours. The demetalled aldehydic phase is removed via line 38 and may be passed directly to a wash tower to remove residual acidity and additional water soluble cobalt. If desired, the product is passed via line 38 to a mixer-settler device 39 wherein it may be contacted with 0 to 200 volume percent water via line 41 and allowed to separate for recovery of decobalted product via line 40. The aqueous phase containing some cobalt salts may be recycled in all or part, depending on the quantity, via line 30 to decobalter 44, or sewered or otherwise disposed of via line 45. The cobalt acetate laden aqueous phase recovered from settler 37 may be in part recycled to the oxonation stage via line 43 and at least a substantial portion of the remainder is recycled to the decobalter via line 33. In accordance with this invention from 30 to 98, preferably from 60 to 90, volume percent of the aqueous phase from the settler 37 is recycled to the decobalter to provide cobalt ions and for the purpose of enriching the aqueous system with cobalt. By this internal recycle modification the cobalt concentration in the aqueous phase, i.e., line 43, is in the order of 2–4 weight percent or higher as compared to cobalt concentrations in the order of 0.5 to 1.5 without this internal recycle.

Thus, in conventional acid decobalting systems the cobalt is recovered in a dilute aqueous phase and if this stream is recycled in an amount sufficient to provide the catalyst requirements of the carbonylation reactor, the associated water content would cause reactor upset by flooding. By the present technique a major proportion of the catalyst in the system may be recycled in sufficient amounts with a lesser quantity of water and without danger of reactor flooding. If desired, the active cobalt catalyst to the carbonylation stage may contain both aqueous cobalt ions from the decobalter and oil soluble cobalt fatty acid salts from extraneous sources, for instance, via line 25.

In the present system demetalling is effected in the presence of a high concentration of cobalt ions. To show the operability of demetalling with cobalt acetate, reference is had to the following example which shows the results of three decobalting runs under different conditions.

EXAMPLE 1

*Decobalting with Cobalt Acetate*

| Treating conditions [2] | Co oleate [1] | Co acetate [1] | Co acetate [1] |
|---|---|---|---|
| Vol. percent aqueous cobalt acetate on total oxonation product | 14.9 | 15.9 | 16.5 |
| Concentration (cobalt) weight percent | 2.4 | 2.4 | 2.4 |
| Temperature, °F | 90–95 | 150 | 90–95 |
| Shaking time, min | 10 | 120 | 10 |
| Pressure | Atm. | Atm. | Atm. |
| Cobalt: | | | |
| Percent removed from total oxonation product | 71.5 | 98.0 | 92.3 |
| Remaining in total decobalted product, p.p.m. | 420 | 28 | 130 |
| Weight percent in aqueous phase, after treating | 2.9 | 3.1 | 3.1 |

[1] Represents the catalyst employed in the oxo process to derive the contaminated aldehyde product.
[2] All conditions relate to the treatment of the contaminated product.

Example 2 which follows describes a specific example of the process with reference to the numbers on the drawings.

EXAMPLE 2

*(With Reference to Drawing)*

| | Specific | Range |
|---|---|---|
| Stream 31b, degassed oxonation product: | | |
| Pressure, p.s.i.g. | 110 | |
| Temperature, °F | 125 | |
| Cobalt, p.p.m. (weight) | 900 | |
| Volumes, total at 60° F | 100 | |
| Volume percent aldehyde plus alcohol | 65 | |
| Vessel 44, decobalter: | | |
| Pressure, p.s.i.g. | 40 | 15 to 500 |
| Temperature, °F | 165 | 90 to 400 |
| Mixing time, minutes | 60 | 10 to 420+ |
| Vessel 37, settler: | | |
| Pressure, p.s.i.g. | 40 | 15 to 500 |
| Temperature, °F | 165 | 90 to 400 |
| Organic phase holding time, min | 180 | 10 to 720+ |
| Stream 32, makeup acid: | | |
| Weight percent acetic acid | 80 | 0 to 100 |
| Volumes at 60° F. as 100% acid | 0.15 | 0 to 10 |
| Stream 34, decobalter recycle | (¹) | (¹) |
| Stream 33, settler aqueous phase recycle: | | |
| Cobalt, p.p.m. (weight) | 35,000 | 12,500 to 80,000 |
| Volumes at 60° F | 10 | 3 to 40 |
| Stream 43, oxo catalyst recycle: | | |
| Cobalt, p.p.m. (weight) | 35,000 | 12,500 to 80,000 |
| Vol. percent settler aqueous phase | 16 | 2 to 70 |
| Volumes at 60° F | 1.9 | 0.60 to 5.0 |
| Stream 41, wash water: | | |
| Volumes at 60° F | 98 | 0 to 200 |
| Temperature, °F | 85 | Cold or hot |
| Stream 40, decobalted product: | | |
| Cobalt, p.p.m. | 25 | 1 to 200 |
| Volumes at 60° F | 98 | |
| Stream 45, wash water purge: | | |
| Volumes at 60° F | 97.8 | 0 to 200 |
| Cobalt (p.p.m.) | 95 | |
| Stream 30, water recycle (makeup): Volumes at 60° F | 0.2 | 0–5 |

¹ Varied to maintain mixing and heat exchange for temperature control.

As employed herein the term "oxo" is considered generic to both the oxonation reaction wherein an aldehyde containing one more carbon atom than the olefin feed is obtained and to the modified oxonation reaction, i.e., the Aldox reaction, where there is also obtained an aldehyde containing two more than twice the number of carbon atoms in the olefin feed.

What is claimed is:

1. A process for demetaling a metal contaminated aldehydic product made by reacting an olefinic hydrocarbon with carbon monoxide and hydrogen in an oxo reaction stage at an elevated temperature and pressure in the presence of a cobalt carbonylation catalyst supplied to said reaction stage at least in part in the form of an oil soluble fatty acid salt which comprises mixing said metal contaminated aldehydic product in a contacting stage at a temperature between about 90° and 400° F. with about 4 to 60 volume percent of an aqueous solution containing at least about 0.5 weight percent of dissolved cobalt and about 0.05 to 10 volume percent of a free fatty acid of 1 to 3 carbon atoms per molecule, the amount of said free acid being sufficient to convert substantially all of the metal contained in said aldehydic product into water soluble compounds, passing the resulting mixture to a settling stage, maintaining the said mixture in the settling stage until there occurs substantially complete separation into a demetaled aldehydic phase containing less than 50 parts per million of cobalt and an aqueous phase, recycling at least a part of the resulting separated aqueous phase from said settling stage to the aforesaid contacting stage, and withdrawing said demetaled aldehydic product from the settling stage.

2. A process according to claim 1 wherein said carbonylation catalyst is employed in said oxo reaction stage in conjunction with an oil soluble salt of a metal selected from groups I, II, IV and VI of the periodic table.

3. A process according to claim 1 wherein said aqueous phase separated in said settling stage contains about 1.25 to 8 weight percent of dissolved cobalt and wherein a part of this aqueous phase is recycled from said settling stage to said oxo reaction stage.

4. A process for demetaling a metal contaminated aldehydic product made by reacting an olefin hydrocarbon with carbon monoxide and hydrogen in an oxo reaction stage in the presence of an Aldox catalyst comprising about 0.02 to 1 weight percent of cobalt and 0.02 to 1 weight percent of zinc based on said hydrocarbon at a temperature between about 200 and 400° F. and under pressure, said catalyst being supplied to said oxo reaction stage at least in part in the form of an oil soluble metal salt of a higher molecular weight fatty acid which comprises mixing said metal contaminated aldehydic product in a contacting stage at a temperature between about 150 and 180° F. and at a pressure between about 30 and 75 p.s.i.g. with about 6 to 20 volume percent (based on aldehyde and alcohol content of said aldehydic product) of an aqueous metal acetate solution containing about 3 to 5 weight percent of dissolved cobalt and with about 0.1 to 0.5 volume percent (based on aldehyde and alcohol content of said aldehydic product) of free acetic acid, the amount of said free acid being sufficient to convert substantially all of the metal dissolved in said aldehydic product into water soluble compounds, passing the resulting mixture to a settling stage, maintaining said mixture in the settling stage until there occurs substantially complete separation into a substantially demetaled aldehydic phase and an aqueous phase containing about 3 to 5 weight percent of cobalt, recycling about 60 to 90 volume per cent of the resulting separated aqueous phase from said settling stage to said mixing stage and at least a part of the remainder of the said separated aqueous phase from said settling stage to said oxo reaction stage to supply catalyst thereto, passing the resulting substantially demetaled aldehydic phase from said settling stage to a washing stage, washing said substantially demetaled aldehydic phase in said washing stage with water until the cobalt content of said aldehydic phase is reduced to less than 10 parts per million of cobalt, and recovering the washed aldehydic phase.

References Cited in the file of this patent

UNITED STATES PATENTS

| | | |
|---|---|---|
| 2,744,921 | Mertzweiller et al. | May 8, 1956 |
| 2,744,936 | Mertzweiller | May 8, 1956 |
| 2,751,403 | Mertzweiller | June 19, 1956 |
| 2,757,205 | Mertzweiller et al. | July 31, 1956 |
| 2,757,377 | Mertzweiller et al. | July 31, 1956 |
| 2,812,356 | Aldridge et al. | Nov. 5, 1957 |